May 14, 1968          J. F. FEELEY          3,382,518
SAFETY STOP FOR SOLE-CUTTING MACHINE
Filed March 14, 1964
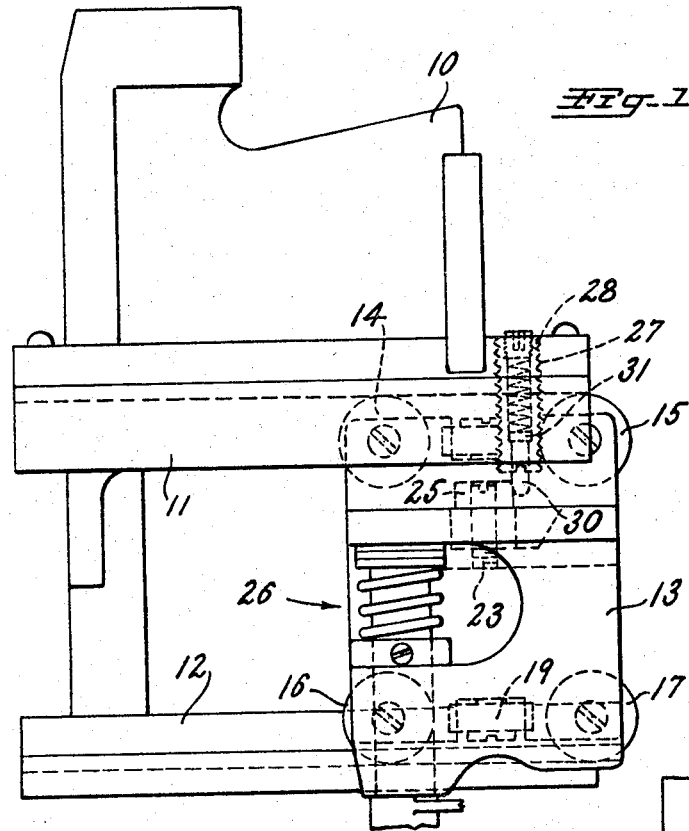
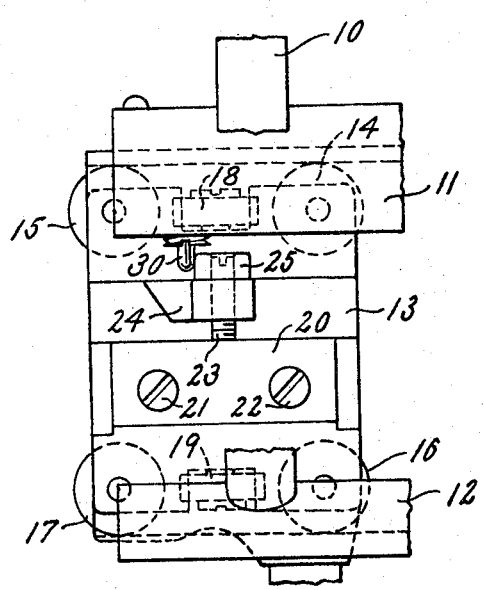
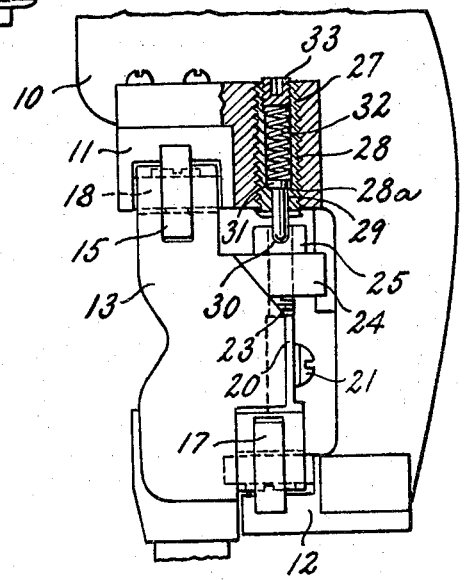
INVENTOR
JOHN F. FEELEY
BY James R. Hulen
ATTORNEY – # United States Patent Office 3,382,518
Patented May 14, 1968

3,382,518
SAFETY STOP FOR SOLE-CUTTING MACHINE
John F. Feeley, Medford, Mass., assignor to Wellman Company, Medford, Mass., a corporation of Maine
Filed Mar. 14, 1967, Ser. No. 623,017
3 Claims. (Cl. 12—86.6)

ABSTRACT OF THE DISCLOSURE

A safety stop for positively limiting the extent of travel of a reciprocating knife block carriage in a sole-cutting machine. The safety stop may be depressed by overcoming the force of a biasing means to permit the removal or replacement of the carriage.

BACKGROUND OF THE INVENTION

(1) Field of the invention

This invention relates to machinery for cutting soles from sole stock material. More particularly, the invention relates to the movable knife block frame on a sole-cutting machine and to a device for limiting the extent of travel of a knife block carriage on the frame.

(2) Description of the prior art

United States Patent No. 1,645,441, issued on Oct. 11, 1927 to P. J. McGowan describes, in detail, a sole-cutting machine for which the present invention is an improvement. The machine described in the patent comprises a knife block frame which is mounted for rapid movement in a circuitous path about a cutting pattern. A knife block carriage which supports the cutting knife is mounted for reciprocal movement in tracks secured to the knife block frame. In normal operation, the carriage travels back and forth in the tracks as the cutting knife follows the outline of the sole.

A thin metal retaining plate which is secured to the frame by a single screw provides the only positive means for limiting movement of the carriage at one end of the tracks and this same plate must be removed to permit the removal or replacement of the carriage on the tracks.

Experience in the operation of the prior machine has revealed that the retaining plate is an unsafe device that has resulted in the failure of the equipment and injury to the operators. Operators have a tendency to pivot the retaining plate to a position away from the tracks to make repairs on the carriage or to replace the carriage. The inadvertent or intentional failure to replace the plate may thus create a hazardous condition.

SUMMARY OF THE INVENTION

The present invention eliminates the hazardous retaining plate of the prior machine and provides a spring biased safety stop pin which is urged into the path of a portion of the carriage and positively limits the movement of the carirage at one end of the tracks. The pin must be depressed with a sufficient amount of force in order to permit the carriage to be removed or replaced on the tracks. The spring tension may be maintained at a desired level by an adjustable screw. All of the elements of the new safety device are located in an aperture extending through the frame and thus provide a totally safe stop means that is free from operator error.

BRIEF DESCRIPTION OF THE DRAWING

FIG. 1 is a fragmentary front elevation of a portion of a sole-cutting machine showing the present invention;

FIG. 2 is a fragmentary rear elevation of a portion of a sole-cutting machine showing the invention; and FIG. 3 is a side elevation of a portion of a sole-cutting machine showing the invention.

DESCRIPTION OF THE PREFERRED EMBODIMENT

Referring to the drawing, a portion of the sole-cutting machine specifically described in U.S. Patent 1,645,441 is shown in detail for the purpose of describing the preferred embodiment of the present invention. Knife block frame 10 is secured at its upper portion to the drive mechanism (not shown) of the sole-cutting machine and driven in a circuitous path around a pattern for the purpose of cutting a sole from sole stock material lying below the pattern. Tracks 11 and 12 are secured in spaced relation on frame 10.

A knife block carriage 13 is mounted for reciprocal movement on tracks 11 and 12. Carriage 13 has a pair of rollers 14 and 15 rotatably mounted on its upper end, which rollers are guided by track 11, and a pair of rollers 16 and 17 rotatably mounted on its lower end and guided by track 12. A pair of rollers 18 and 19 having vertically disposed axes are also mounted on carriage 13 to provide lateral support for the carriage. A plate 20 is secured to carriage 13 by set screws 21 and 22. Set screws 21 and 22 may be loosened to permit the adjustment of plate 20 by screw 23 which is threadedly secured to a boss 24 secured to carriage 13. Screw 23 may be vertically adjusted by a nut 25. The adjustment of plate 20 compensates for wear of rollers 14, 15, 16 and 17.

A knife supporting spindle shown generally at 26 in FIG. 1 is carried by carriage 13. Spindle 26 supports a knife block (not shown) which is specifically described in U.S. Patent No. 1,645,441.

The improved safety stop device will now be described in detail. In order to provide a completely safe stop mechanism, the elements of the mechanism are enclosed entirely within a threaded aperture 27 which extends vertically through a portion of frame 10. A sleeve 28 is threaded into aperture 27 and has a central aperture 29 adapted to receive safety stop pin 30. Pin 30 is equipped with a head 31 which contacts shoulder 28a which extends inwardly from sleeve 28 to prevent the ejection of the pin from aperture 27.

A coiled compression spring 32 is positioned within sleeve 28 atop head 31 and the force of spring 32 on head 31 is controlled by an adjustable screw 33 which is threaded into the upper portion of sleeve 28. It will be apparent from the above description that the only portion of the entire safety stop mechanism that need be exposed is the stop pin 30. Pin 30 is at all times in the extended position to provide a positive means for limiting the extent of travel of carriage 13 to the right on tracks 11 and 12, as viewed in FIG. 1 of the drawing. Pin 30 accomplishes the stopping action by contacting nut 25 as the carriage moves toward the right in FIG. 1. It should be understood that any portion of carriage 13 may be contacted by stop pin 30, but nut 25 was chosen for this preferred embodiment because of its convenient location with respect to the frame 10.

If it is desired to remove carriage 13 from tracks 11 and 12, it is necessary for the operator to depress pin 30, by overcoming the force exerted on head 31 by spring 32, and then nut 25 will clear the bottom of pin 30 to permit removal of the carriage.

Likewise, if it is desired to replace carriage 13 onto tracks 11 and 12, pin 30 must be depressed to permit the proper clearance between the bottom of the pin and nut 25. This unique safety stop mechanism thus provides a positive stop means that is not subject to operator error and that cannot be inadvertently or intentionally left in an inoperative position.

While there has been described what is at present considered to be the preferred embodiment of this invention, it would be obvious to those skilled in the art that various changes and modifications may be made therein without departing from the invention, and it is, therefore, aimed to cover all such changes and modifications as fall within the true scope and spirit of the invention.

Having thus described my invention, what I claim and desire to protect by Letters Patent is:

1. A sole-cutting machine comprising: a knife block frame; carriage tracks secured to said frame; a knife block carriage mounted for reciprocal movement on said tracks; a stop pin mounted in an aperture in said frame; and biasing means in said aperture for urging said stop pin outwardly into contact with a portion of said carriage to positively limit the travel of said carriage at one end of said tracks, said stop pin being movable into said aperture by overcoming the force of said biasing means, so that, said carriage may be removed from and replaced on said tracks.

2. The sole-cutting machine of claim 1 further comprising a head on said stop pin and stop means secured in the end of said aperture for contacting said head to prevent ejection of said pin from said aperture.

3. The sole-cutting machine of claim 2 wherein said biasing means is a coiled compression spring that is held against the head of said stop pin by an adjustable screw threadedly secured in the other end of said aperture.

References Cited

UNITED STATES PATENTS

| | | | |
|---|---|---|---|
| 1,418,604 | 6/1922 | Patten | 12—86.6 |
| 1,645,441 | 10/1927 | McGowan | 12—86.6 |
| 2,235,996 | 3/1941 | Hogan | 12—86.6 |

PATRICK D. LAWSON, *Primary Examiner.*